UNITED STATES PATENT OFFICE.

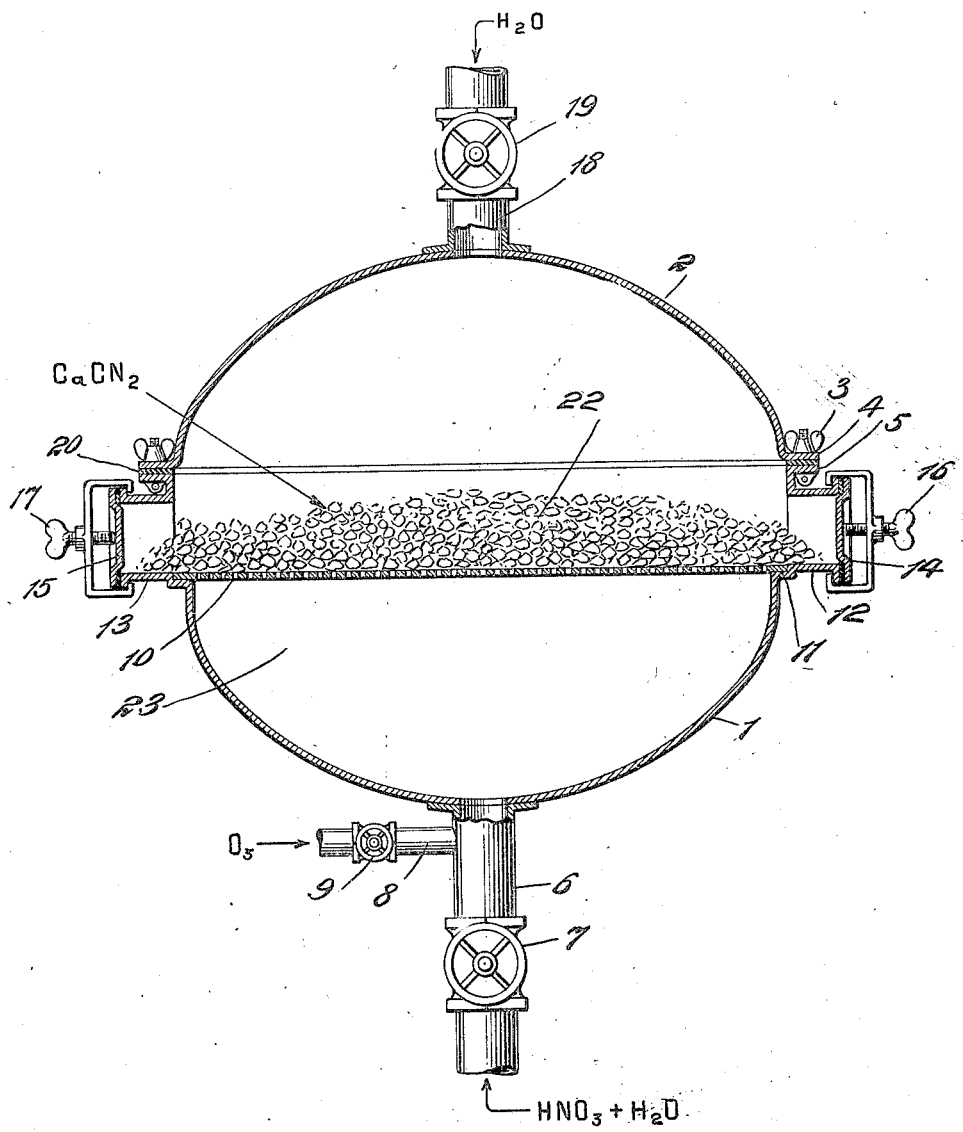

JAMES HENRY REID, OF PITTSBURGH, PENNSYLVANIA, ASSIGNOR TO INTERNATIONAL NITROGEN COMPANY, A CORPORATION OF DELAWARE.

PROCESS OF MAKING NITRIC ACID.

1,400,912.  Specification of Letters Patent.  Patented Dec. 20, 1921.

Application filed September 10, 1917. Serial No. 190,453.

*To all whom it may concern:*

Be it known that I, JAMES HENRY REID, a citizen of the United States, residing in the city of Pittsburgh, county of Allegheny, State of Pennsylvania, United States of America, have invented certain new and useful Improvements in Processes of Making Nitric Acid, of which the following is a specification.

This invention relates to the production of nitric acid by the oxidation of ammonia and has for its general object to produce a maximum quantity of such acid from a given quantity of ammonia.

It has been proposed to produce ammonia by the treatment of cyanamid or nitrolime with steam; also, as a separate process, to treat ammonia with ozone in order to produce nitrous and nitric acid.

In my process, the ammonia as generated or evolved, and while in a nascent condition, is subjected to the action of ozone, thus greatly increasing the proportion of nitric acid and correspondingly decreasing the proportion of nitrous acid obtainable therefrom as compared with the treatment of ammonia, while in its ordinary condition, with ozone.

The process will be described in connection with the treatment of calcium cyanamid with steam, the drawing being a view, partly in section and partly in elevation, of an apparatus wherein the said process may be realized.

Describing the parts by reference characters, 1 denotes a receptacle, provided with a cover 2, which is removably connected to said receptacle by means of the swinging wing-nut bolts 3 pressing the cover flange 4 against a washer or gasket 20 on the receptacle flange 5 to which the bolts are pivotally connected.

The lower part of the receptacle 1, is provided with the outlet duct or pipe 6, controlled by valve 7, which carries the inlet duct or pipe 8, controlled by valve 9.

Removably situated within the central portion of the receptacle 1, is the perforated diaphragm or septum 10, resting upon the support 11.

Communicating with the receptacle 1, above the support 11, are the tubular extensions 12, and 13, provided with the closures 14, and secured by the screw-clamps 16, and 17.

The cover 2, is provided with the inlet duct 18, controlled by valve 19, whereby steam may be supplied to the apparatus in a controlled manner.

In practising my process with the apparatus shown herein, the cover 2 is removed and calcium cyanamid in granulated form is placed and spread upon the porous diaphragm or septum 10, to a suitable depth. The cover 2 is then secured to the lower part of the receptacle 1, by means of the swinging wing-nut bolts 3, a suitable washer or packing 20 having been placed between the flanges 4 and 5.

The closures 14 and 15, being in place and secured by the screw clamps 16 and 17, the valves 19 and 7 are slightly opened and a stream of steam gradually passed into the receptacle by means of the duct or pipe 18, and through the bed of calcium cyanamid 22, where a reaction takes place and ammonia is produced, which ammonia passes down through the pervious or porous diaphragm or septum 10, into the chamber 23, in the lower part of the receptacle 1, below it.

Ozone is then admitted into the chamber 23, through the duct 8, by slightly opening the valve 9, where it mixes with the nascent ammonia and oxidizes it to nitric acid, which nitric acid collects on the walls of the chamber 23, and accumulates, runs down and is discharged through the duct or pipe 6, and valve 7, and is delivered into a suitable reservoir such as a carboy or other storage receptacle (not shown).

When it is desired to remove the spent calcium cyanamid and supply fresh material the covers 14 and 15 may be removed, by releasing the screw clamps 16 and 17, and withdrawing the spent material through either of the extensions 12 or 13, and new or fresh calcium-cyanamid supplied through the opposite extensions, both extensions then again closed by the closures 14 and 15 and secured by the screw clamps 16 and 17, it being noted that the supply of steam and ozone are shut off during the process of removing the spent calcium cyanamid and the supplying of fresh material by closing the valves 9 and 19.

Any suitable nitrogen containing compound capable of yielding ammonia by the action of water or steam may be employed instead of calcium cyanamid and the water may be supplied as a spray, vapor or other form without departing from the spirit of the invention.

The ozone employed may be supplied directly as such from a suitable storage receptacle or may be produced by the action of an electrical discharge on oxygen, or the ozone may be associated with nitrogen as would result from the action of an electric discharge of sufficient voltage on ordinary air to convert the oxygen present into ozone without oxidizing the nitrogen.

If the proportions of ammonia and ozone be properly adjusted and maintained, practically all of the acid obtained will be nitric acid; and, from a given quantity of ammonia, a maximum quantity of nitric acid (with a correspondingly small proportion of nitrous acid) will be produced.

Instead of employing calcium cyanamid as a source of ammonia when acted upon by water or steam, any other substance capable of evolving ammonia when acted upon by water or steam may be employed without departing from the spirit of the invention.

Having described my invention, what I claim is:—

1. The process of making nitric acid which comprises subjecting nascent ammonia to the action of ozone.

2. The process of making nitric acid which comprises treating with a suitable reagent a substance capable of yielding ammonia, thereby to produce such ammonia, and subjecting the ammonia, substantially as and when evolved, to the action of ozone.

In testimony whereof I affix my signature in the presence of two witnesses.

JAMES HENRY REID. [L. S.]

Witnesses:
ERNEST H. BALL,
F. L. WHRITNER.